3,007,594
PLASTIC COATED ARTICLES AND METHOD FOR MAKING THE SAME
Robert T. Wallace, Ottawa Hills, Ohio, assignor to Owens-Illinois Glass Company, a corporation of Ohio
Filed Aug. 6, 1959, Ser. No. 832,082
10 Claims. (Cl. 215—1)

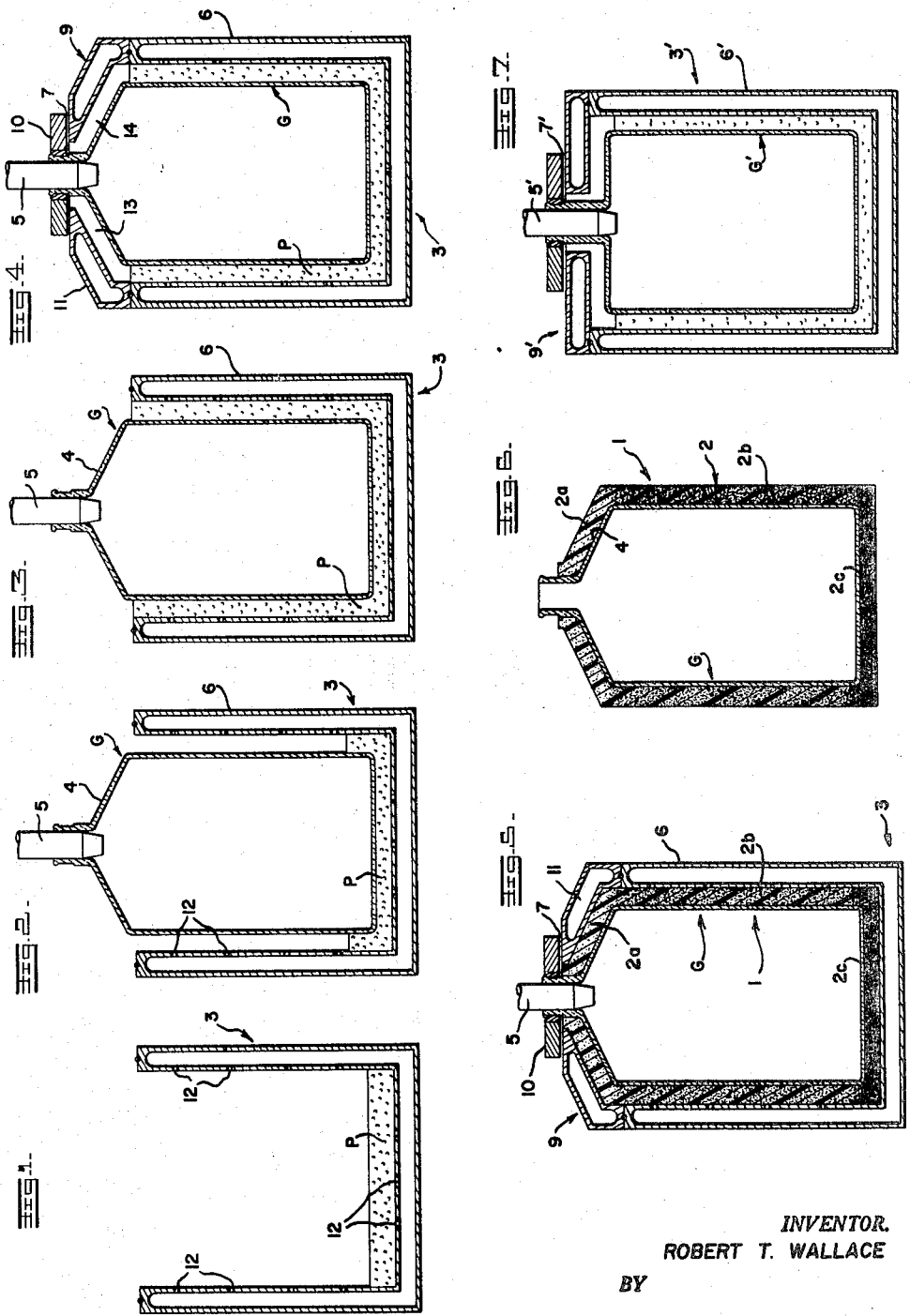

This invention relates generally to fragile articles and more particularly to glass containers which have improved resistance to breakage due to mechanical shock. More specifically this invention is directed to articles such as glass containers having a surface which is modified by application of a plastic coating or casing thereto for the purpose of making the articles less susceptible to cracking or breaking due to mechanical impact and to a method for making such plastic coated containers.

It has been customary in order to minimize breakage to encase large glass containers, such as carboys, in packing material all of which is placed in a cardboard or wooden box. These have been found to have a number of disadvantages including bulkiness and excessive weight. In addition with some of the large carboys of six and one-half gallons capacity and which may be used for holding drinking water, the cost of the packing has exceeded the cost of the liquid stored therein. Finally in spite of all of the packing material used plus its enclosing carton, the glass carboy has often been broken in shipping. Where the carboy contains corrosive chemicals, there is also the danger of damaging other containers nearby or injuring indiivduals who have to handle the carboys.

In the manufacture of protective plastic casings for fragile articles it would be desirable to form the same with walls with variable density in order that the casings will be stronger in certain areas so as to withstand the added stress and strain they have to undergo in contrast to areas which are subject to less shock which can be made less dense. This has the further advantage in that it results in a more efficient utilization of a given amount of molding material used to make the casing.

In view of the above problems associated with packing fragile containers for shipping it is an object of this invention to provide the containers which have a greater resistance to mechanical breakage.

It is another object of this invention to provide a coating for a container which is less bulky and lighter in weight than present packing containers used to encase fragile articles.

A further object of this invention is to provide a fragile container with a coating of variable density for protection against breakage whereby the density and therefore the strength of the coating will be greatest where the container is subject to the greatest mechanical impact and shock.

A further object of this invention is to provide a method for fabricating the walls of casings whose walls will be adapted to withstand variable stresses and strains.

A further object of this invention is to provide a preferred method for shaping plastic casings in which the walls are denser in those areas subject to greater stress and shock and less dense in those areas which are subject to lesser stress and shock.

A further object is to provide a method for producing cellular plastic casings in which the plastic materials which make up the casings are more efficiently utilized to provide casings of maximum strength under varying conditions of stress, strain and shock.

A further object is to provide a method for producing cellular plastic casings which are lighter and yet stronger than conventional casings presently being employed in which the plastic materials which make up the casings are more efficiently utilized to provide casings of maximum strength under varying conditions of stress, strain and shock.

It is a still further object of the present invention to provide a protective surface for a fragile article which is considerably less expensive than conventional packing cartons for the same purpose. These and other objects will be apparent from the description which follows.

The present invention comprises a novel plastic coated fragile article having a coating of cellular plastic, preferably polystyrene, of differential density. In the preferred embodiment the coating is made adherent to the fragile article. Due to the differences in density of the polystyrene coating, the strength thereof is greatest where the density reaches a maximum and least where the density reaches a minimum. The present invention also includes a method for manufacturing the aforementioned plastic coated containers and incidentally thereto discloses apparatus for effecting the same.

The present invention will be more completely understood by reference to the following drawings in which:

FIGURE 1 is a perforated mold in section partly filled with heat expansible plastic beads which are partially expanded.

FIGURE 2 shows the article or carboy to be encased as centrally positioned within the mold cavity.

FIGURE 3 shows the mold cavity incompletely filled with additional heat expansible plastic beads.

FIGURE 4 shows the mold in closed position.

FIGURE 5 shows the mold closed with heat applied causing an expansion of the beads to enclose completely the carboy.

FIGURE 6 is a sectional view of a plastic coated bottle made in accordance with this invention.

FIGURE 7 is similar to FIGURE 4 but shows a non-perforated mold of different configuration.

Referring to the drawings, the plastic coated container 1 shown in FIGURE 6, consists of a glass bottle G enveloped by a foamed plastic coating 2 of polystyrene of variable density. The most dense area is indicated as $c$, a less dense area as $b$, and the least dense area as $a$. Since area $c$ is the most dense with polystyrene, it is also the strongest which is most desirable since this is the area which is subject to the most mechanical shock due largely to dropping of the plastic coated container. Area $b$ which is less dense is found to be subject to the next greatest amount of mechanical shock due largely to lateral compressive forces. Finally it has been noted that area $a$ is usually subject to the least mechanical shock. However, this area is the least dense and accordingly has the least strength. The net result is that for a given amount of a plastic plastic to be used as a coating, the plastic coated container of this invention provides the most efficient utilization of the plastic. It will be noted that if the container had a foamed plastic coating of uniform density, the strength thereof would be the same throughout such that certain areas which are subject to the least amount of shock would be stronger than necessary while areas which need to withstand greater impacts from mechanical forces would be of no greater density or strength, and accordingly would be more prone to breakage in those areas.

The relationship of density of foamed or cellular plastic to strength is illustrated by the following table:

TABLE I

*Correlation of strength with density*

| Density of Cellular Polystyrene Coating | Compressive Strength, p.s.i. | Unnotched Impact Strength (Izod Test) |
| --- | --- | --- |
| 2 lb. per cu. ft. | 18 | 2 in. lbs. per in. |
| 4 lb. per cu. ft. | 36 | 2.8 in. lbs. per in. |
| 6 lb. per cu. ft. | 55 | 3.5 in. lbs. per in. |

It will be apparent from the foregoing table that if in FIGURE 6 the cellular polystyrene plastic has a 2 lb. per cu. ft. density in area *a*, a 4 lb. per cu. ft. density in area *b*, and a 6 lb. per cu. ft. density in area *c*, the surface of the plastic coated article will exhibit varying degrees of strength.

Although the density of plastic coating may vary from 2 to 6 lbs. per cu. ft., higher and lower ranges of densities may be employed depending upon how fragile the article being enclosed is. In certain applications densities ranging from 1 lb. per cu. ft. to a maximum of 3 lb. per cu. ft. may satisfactorily be employed.

It has also been noted that protective plastic lining is more effective if an adhesive 4 is applied between the plastic 2 and container 1 as shown in FIGURE 6.

The foam encased glass articles of the present invention have been found extremely resistant to breakage in spite of their light weight. For example, a 6½ gallon carboy encased in a conventional packing and wood enclosed box weighs 36½ lbs. and will not survive a drop test of 85 inches. On the other hand a foam encased 6½ gallon carboy of this invention weighs only 18½ lbs. and does not break from the maximum testing distance used, namely, 90 inches. The test referred to is the standard I.C.C. swing test which consists of placing the carboy filled with water in a swing cradle and then swinging the cradle in pendulum fashion against an impact block for distances from 55" to 90". Whether the impact was directed against the side or bottom of the encased carboy, no breakage of the bottle occurred although in some tests involving side impacting the casing exhibited some cracking. However, this cracking did not occur where an adhesive was employed between the carboy and outer plastic casing.

The method and apparatus for making the plastic coated articles of this invention may best be understood by reference to FIGURES 1 through 5 inclusive. More specifically the steps in molding the plastic coated articles of this invention include first partly filling mold 3, which has hollow walls 6 with perforations 12 on its inner surface, with heat expansible plastic beads P which are partially expanded as shown in FIGURE 1 and thereafter centrally positioning by means of support 5 within the mold cavity the article or carboy G to be encased as indicated by FIGURE 2. With the carboy in position the mold is incompletely filled with additional heat expansible plastic beads as illustrated by FIGURE 3. Mold 3 is then closed by upper mold member 9, which is not perforated, and sealing plate 10 as shown by FIGURE 4. Superheated dry steam at 220–280° F. and 10–30 p.s.i. is introduced into the hollow mold walls 6 and 11 as shown by FIGURE 5 from a source of steam (not shown). The molding cycle takes from 15 to 60 seconds with perforated mold members depending upon the temperature of the steam and the material from which the mold is made. Of course where non-perforated mold members are employed the heating cycle will be longer. The same will be true where iron molds are used instead of aluminum molds. The introduction of the steam results not only in expanding the beads further so as to fill the mold cavity in areas 13 and 14 (compare FIGURES 4 and 5), but also causes the beads to fuse and coalesce in such a manner that the area around the neck of the container is least dense. The most dense area, and therefore the strongest, is the plastic which lies along the bottom and is indicated by *c*. Part of this increased density is due to the entrapment of the bead particles (see FIGURE 2) which does not permit the bead particles located in this area to expand freely and therefore to become less dense. So as to ensure a free flow of gas generated in the mold cavity, bleed passages 7 for the gas to escape are provided. In the preferred mode of operation an adhesive 4 is first applied to the container before insertion of the carboy G into the mold (see FIGURE 2). As mentioned above it has been noted that the protective plastic coating is still more resistant to breakage if an adhesive 4 is applied between the plastic 2 and container 1 as shown in FIGURE 6. After completion of the molding cycle the mold is allowed to cool, usually from 1 to 6 minutes, and the encased carboy thereafter removed. This cooling step may be accelerated by passing water through the hollow walls 6 of the mold after the steam heating step has been completed.

FIGURE 7 is similar to FIGURE 4 except that the article is of a different shape and corresponding parts are indicated by letter and number with a prime (') thereafter. It will be noted in FIGURE 7 that neither the upper nor lower mold member has perforated walls to permit the steam to come into direct contact with the plastic beads for purposes of effecting an expansion and coalescence thereof. The apparatus of FIGURE 7 may be said to be illustrative of indirect steam heating of the plastic beads in contrast to the apparatus of FIGURES 1–5 which is illustrative of direct steam heating of the plastic beads.

Various adhesives either of the (1) drying type or (2) thermosetting type may be used. Representative of the drying type are Marbon 11670, a resin or rubber emulsion, made by the Marbon Corporation, Gary, Ind., or Styrogrip 145–0, a resin or rubber solvent, made by the Hughes Glue Company, Detroit, Mich. Typical of the thermosetting type are Hysol 2020 made by Houghton Laboratories, Olean, N.Y., and Epon VI made by the Shell Chemical Corporation, New York City, which are both of the cold setting epoxy type.

As a specific example of a suitable adhesive there can be mentioned, for instance, a liquid epoxy resin known as Epon 828 having an epoxide equivalent of 175–210 and a Gardner-Holdt viscosity at 25° C. of 50–150 poises, and prepared by the reaction of Bisphenol-A with epichlorohydrin to obtain condensation polymers having a basic structure believed to be as follows:

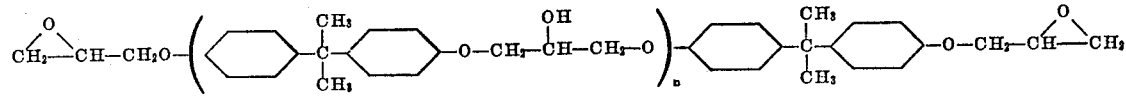

This resin is cured by mixture with about six parts of diethylaminopropylamine per 100 parts of resin. This mixture is coated on the container to which the plastic covering is to be bonded.

A plastic suitable for encasing the containers includes a polystyrene such as Dylite which is in the form of beads and manufactured by the Koppers Company, Inc., Pittsburgh, Pa. These polystyrene beads contain a volatile liquid, n-pentane, as an expanding agent. Particulate polystyrene containing any volatile liquid expanding agent can be employed. These beads can be given a pre-expansion treatment which consists of heating the original or virgin beads from 180–240° F. until densities ranging from 1 to 5 lbs. per cubic foot are obtained depending upon the density desired. However, any plastic can be used which is capable of being formed and further expanded upon the application of additional heat in the manner described above.

It is understood that the invention described above is a preferred embodiment particularly as exemplified by the direct steam heating method and apparatus; and that certain variations can be made without limiting the scope of the invention herein disclosed. By way of example the mold cavity may have other shapes than that shown and the upper mold member 9 may also be perforated. Moreover, the steam heating means may be placed by other heating means such as by resistance or inductance electrical heating, if found desirable. In addition other fluids than steam capable of being heated to high temperatures without decomposition may be employed. To facilitate removal of the encased carboy the mold members 3 and 9 may be coated with any of the well-known mold release agents or lubricants such as the silicones. Finally the carboy may be preheated prior to placement in the mold so as to avoid any breakage due to thermal shock during the heating of the plastic beads. Other appropriate changes may be made within the skill of one familiar with the art without circumscribing or limiting the invention set forth herein, and the invention may take other forms as a result of these changes and yet come within the scope of the appended claims.

Although glass has been shown as the preferred composition of the article being encased by the plastic, it is to be understood that the article to be encased may be made of wood or plastic.

From the foregoing description it will be apparent that the applicant has devised a plastic coated article, including a method and apparatus for making the same, which is light in weight, resistant to mechanical impact, and relatively inexpensive to make.

Having thus described the invention it will be evident to those skilled in the art that various modifications may be made which would not depart from the spirit of the present invention as defined in the following claims.

What I claim is:

1. A container of increased resistance to mechanical breakage comprising an inner fragile portion having an area subject, in the normal handling of said container, to a greater external mechanical shock than another area of said inner fragile portion, and an outer plastic covering characterized by having a cellular structure and areas of lesser and greater density wherein the area of greater density is adjacent to that area of the inner fragile portion which is subject to a greater external mechanical shock and the area of lesser density is adjacent to that area of the inner fragile portion which is subject to a lesser external mechanical shock.

2. The container of claim 1 in which the inner fragile portion is glass.

3. The container of claim 1 in which the inner fragile portion is wood.

4. The container of claim 1 in which the outer plastic covering is polystyrene.

5. The container of claim 1 in which the outer plastic covering is of substantially uniform thickness.

6. A container of increased resistance to mechanical breakage comprising an inner fragile portion having an area subject, in the normal handling of said container, to a greater external mechanical shock than another area of said inner fragile portion, an outer plastic covering characterized by having a cellular structure and areas of lesser and greater density wherein the area of greater density is adjacent to that area of the inner fragile portion which is subject to a greater external mechanical shock and the area of lesser density is adjacent to that area of the inner fragile portion which is subject to a lesser external mechanical shock, and an adhesive layer joining said inner portion with said outer covering.

7. The container of claim 6 in which the inner fragile portion is wood.

8. The container of claim 6 in which the inner fragile portion is glass.

9. The container of claim 6 in which the outer plastic covering is polystyrene.

10. The container of claim 6 in which the outer plastic covering is of substantially uniform thickness.

References Cited in the file of this patent

UNITED STATES PATENTS

| | | |
|---|---|---|
| 2,552,641 | Morrison | May 15, 1951 |
| 2,685,319 | Swasko | Aug. 3, 1954 |
| 2,706,571 | Ryan | Apr. 19, 1955 |
| 2,727,278 | Thompson | Dec. 20, 1955 |
| 2,781,551 | Richerod | Feb. 19, 1957 |
| 2,830,721 | Pinsky et al. | Apr. 15, 1958 |
| 2,910,730 | Risch | Nov. 3, 1959 |
| 2,929,525 | Glover et al. | Mar. 22, 1960 |
| 2,942,301 | Price et al. | June 28, 1960 |

FOREIGN PATENTS

| | | |
|---|---|---|
| 289,213 | Switzerland | June 16, 1953 |
| 542,946 | Italy | May 11, 1956 |